US005942298A

United States Patent [19]

Sakaya et al.

[11] Patent Number: 5,942,298
[45] Date of Patent: Aug. 24, 1999

[54] LAMINATED FILM

[75] Inventors: Taiichi Sakaya; Toshiya Kuroda, both of Osaka, Japan

[73] Assignee: Sumitomo Chemical Company, Limited, Osaka, Japan

[21] Appl. No.: 08/759,636

[22] Filed: Dec. 5, 1996

[30] Foreign Application Priority Data

| | | | |
|---|---|---|---|
| Dec. 5, 1995 | [JP] | Japan | 7-316662 |
| Dec. 5, 1995 | [JP] | Japan | 7-316663 |

[51] Int. Cl.$^6$ .................... B29D 22/00; B32B 18/00

[52] U.S. Cl. .................... 428/36.6; 428/36.7; 428/325; 428/336; 428/474.4; 428/477.7; 428/480; 428/483; 428/516; 427/172; 427/173; 427/189; 427/202

[58] Field of Search .................... 428/325, 336, 428/474.4, 477.7, 480, 483, 516; 427/36.6, 36.7, 172, 173, 189, 202

[56] References Cited

U.S. PATENT DOCUMENTS

| | | | |
|---|---|---|---|
| 4,209,551 | 6/1980 | Masaki et al. | 427/68 |
| 5,100,934 | 3/1992 | Glesias | 523/456 |
| 5,188,867 | 2/1993 | Chu et al. | 427/173 |

FOREIGN PATENT DOCUMENTS

| | | |
|---|---|---|
| 0 381 454 A1 | 8/1990 | European Pat. Off. . |
| 0 404 433 A2 | 12/1990 | European Pat. Off. . |

*Primary Examiner*—Leszek Kiliman
*Attorney, Agent, or Firm*—Birch, Stewart, Kolasch & Birch, LLP

[57] ABSTRACT

A laminated film comprising a base film and a layer which contains an inorganic layered compound and a resin and is formed by gravure coating a coating fluid comprising the inorganic layered compound and the resin under the conditions satisfying the following equation:

$$7<\log[2((G/B)\times100)^2\times(B+G)^2\times(GM)]<13$$

wherein G is a rotational speed of a gravure roll (m/min.), B is a rotational speed of a backing roll (m/min.) and GM is a mesh number of a gravure roll, which film has good transparency and gas barrier properties.

16 Claims, 1 Drawing Sheet

LAMINATED FILM

BACKGROUND OF THE INVENTION

1. Field of the Invention

The present invention relates to a laminated film having good transparency which is produced by a gravure coating method. In particular, the present invention relates to a laminated film having good transparency, gas barrier properties and moisture vapor barrier properties, and few flaws on a base film.

2. Description of the Prior Art

Packaging materials are required to have diverse functions. In particular, barrier properties against various gasses (gas barrier properties) for protecting contents in the package are important properties which have influences on preservation of food. The importance of the gas barrier properties is increasing because of diversification of distribution systems and packaging technology, the regulations on additives, and change of tastes.

Factors for deteriorating the quality of food include oxygen, light, heat, moisture and the like. Among them, oxygen is one of the main factors deteriorating the quality of food. Thus, barrier materials comprising metals or glass having gas barrier properties can cut off oxygen effectively and also they are indispensable materials for means for controlling the change of quality of food, for example, filling of inert gasses or vacuum packaging.

The barrier materials which have barrier functions against not only the oxygen gas but also various gasses, organic solvent vapors, aromas and the like are effective in preventing rusts, odors and sublimation, and widely used in various fields such as the food, cosmetic, agrochemical and pharmaceutical fields in the form of bags for sweets, packages for flakes of dried bonito, pouches for boil-in-the-bag foods, containers for carbonated drinks, and the like.

Among thermoplastic resin films, orientated films of polypropylene, polyesters, polyamides and the like are widely used as packaging materials since they have good mechanical properties, heat resistance and transparency. When these films are used as the packaging materials for food, the contained food may be denatured through oxidative degradation or by aerobic microorganisms, the flavor is lost because of the dissipation of aromas through the films, and the taste is deteriorated because the moisture in the atmosphere penetrates into the packaged food and then the food is wetted.

Also, films of transparent resin materials having high gas barrier properties such as polyvinyl alcohols, ethylene-vinyl alcohol copolymers and polyvinylidene chloride resins are available. However, the gas barrier properties of these resins as the packaging materials are still insufficient in comparison with the metals or glass materials which are used for canned or bottled foods.

As one of the methods for improving the gas barrier properties of such resin films, it is tried to laminate a layer comprising inorganic layered compound and resins on the resin films by applying a coating fluid containing the inorganic layered compounds and resins. However, the laminated films may not have sufficient transparency.

SUMMARY OF THE INVENTION

One object of the present invention is to provide a laminated film having good transparency which is produced by applying a coating fluid comprising an inorganic layered compound and a resin on a base film.

Another object of the present invention is to provide a laminated film having good transparency which does not suffer from minute scratches on the base film when the coating fluid is applied on the base film.

Accordingly, the present invention provides a laminated film comprising a base film and a layer which contains an inorganic layered compound and a resin and is formed by gravure coating a coating fluid comprising the inorganic layered compound and the resin under the conditions satisfying the following equation (1):

$$7<\log[2((G/B)\times 100)^2\times(B+G)^2\times(GM)]<13 \qquad (1)$$

wherein G is a rotational speed of a gravure roll (m/min.), B is a rotational speed of a backing roll (m/min.) and GM is a mesh number of a gravure roll.

DETAILED DESCRIPTION OF THE INVENTION

Figure 1:
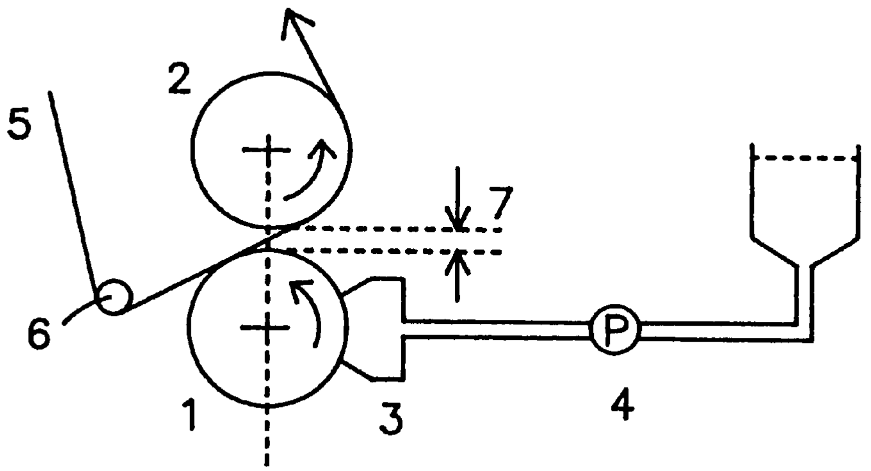
FIG. 1 schematically shows an embodiment of the kiss reverse coating process.
Figure 2:
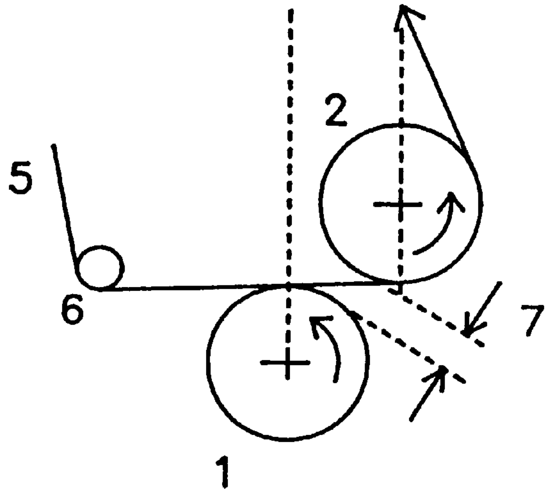
FIG. 2 schematically shows another embodiment of the kiss reverse coating process in which the line connecting the axes of the gravure and backing rolls is not perpendicular to the plane of the base film.

The "inorganic layered compound" used in the present invention means an inorganic compound having a layered structure in which unit crystalline layers are laminated. The "layered structure" means a structure in which planes consisting of densely orientated atoms bonded strongly by covalent bonds and the like are piled up in parallel with each other through weak bonding forces such as the van der Waals force.

The inorganic layered compound used in the present invention has an "aspect ratio" of between 50 and 5000 when measured by the method described below, and a "particle size" of 5 $\mu$m or less when measured by the method described below.

The aspect ratio is preferably at least 100, more preferably at least 200, in view of the gas barrier properties of the laminated film, while it does not exceed preferably 3000, more preferably 2000, in particular 1500, in view of the production cost and economical reasons.

The particle size of the inorganic layered compound is preferably 3 $\mu$m or less in view of the transparency of the laminated film, and in particular 1 $\mu$m or less when the laminated film is used for the applications in which the transparency is important such as the packaging of food.

Specific examples of the inorganic layered compound used in the present invention are graphite, phosphate derivative type compounds (e.g. zirconium phosphate type compounds), clay minerals, chalcogen compounds (e.g. dichalcogen compounds of the formula: $MX_2$ in which M is an atom of the VI group (Ti, Zr or Hf), V group (V, Nb or Ta) or VI group (Mo or W) of the Periodic Table, and X is a chalcogen atom (S, Se or Te)).

The particle size of the inorganic layered compound used in the present invention is measured by a dynamic light scattering method in a solvent. It is very difficult to measure the true particle size of the inorganic compound in the resin composition, but the particle size of the inorganic compound in the resin composition may be close to that in the solvent, when the organic compound which has been thoroughly swelled with the same solvent as that used in the dynamic light scattering method is compounded in the resin.

The aspect ratio (Z) of the inorganic layered compound is represented by the formula:

$$Z=L/a$$

in which "a" is a unit thickness (interplanar spacing) of the inorganic layered compound and L is a particle size of the inorganic layered compound measured by the dynamic light scattering method in the solvent.

The thickness "a" is measured by the powder X-ray diffraction method with the inorganic layered compound alone.

The inorganic layered compound preferably has a swelling or cleaving property which will be explained later, in view of the gas barrier properties of the laminated film.

The degree of swelling or cleavage of the inorganic layered compound in a dispersing medium can be evaluated by the following swelling and cleaving tests.

The inorganic layered compound has preferably the value of at least about 5 (ml), more preferably at least 20 (ml) which is obtained in the following swelling and cleaving tests, since such value indicates the larger aspect ratio.

SWELLING TEST

A dispersing medium (100 ml) is charged in a 100 ml measuring cylinder, and then an inorganic layered compound (2 g) is added to the dispersing medium. After being kept standing at 23° C. for 24 hours, the volume of the dispersion layer containing the inorganic layered compound is read from a graduation line at the interface between the dispersion and the supernatant. The larger volume of dispersion means the higher swelling property.

CLEAVING TEST

An inorganic layered compound (30 g) is added to a dispersing medium (1500 ml) and dispersed with a dispersing apparatus (Disper MH-L manufactured by Asada Iron Works Co., Ltd. having a blade diameter of 53 mm. Rotation speed: 3100 rpm. Container volume: 3 liters. Distance between the bottom and the blade: 28 mm) at a peripheral speed of 8.5 m/sec. at 23° C. for 90 minutes. Then, 100 ml of the dispersion is poured in a measuring cylinder and kept standing for 60 minutes. The volume of the dispersion layer containing the inorganic layered compound is read from a graduation line at the interface between the dispersion and the supernatant. The larger volume of dispersion means the higher cleaving property.

Typical examples of the inorganic layered compounds which are swelled or cleaved in the dispersing medium are clay minerals which are swelled or cleaved in the dispersing medium.

The clay minerals are grouped as the two layer structure type comprising a tetrahedral layer of silica and an octahedral layer having aluminum or magnesium atoms as center metal atoms which is present on one side of the tetrahedral layer, and as the three layer structure type comprising a tetrahedral layer of silica and two octahedral layers having aluminum or magnesium atoms as center metal atoms which are present on respective sides of the tetrahedral layer. Examples of the two layer structure type are kaolinites, antigorites, and the like. Examples of the three layer structure type are smectites, vermiculites, micas and the like according to the number of interlayer cations.

Specific examples of those clay minerals are kaolitine, dickite, nacrite, halloysite, antigorite, chrysotile, pyrophylite, montmorilonite, beidelite, nontronite, saponite, sauconite, stevencite, hectorite, tetrasilylic mica, sodium taeniolite, common mica, margarite, talc, vermiculite, phlogopite, xanthophylite, chlorite, and the like. The clay minerals may be treated with organic materials, which will be referred to as organic-modified clay minerals. Examples of the organic-modified clay minerals are found in "Dictionary of Clays" (NENDO NO JITEN) published by Asakura Shoten.

Among the above clay minerals, smectites, vermiculites and micas are preferred in view of the swelling or cleaving properties. The smectites such as montmorilonite, beidelite, nontronite, saponite, sauconite, stevencite and hectorite are particularly preferred.

The dispersing medium which swells or cleaves the inorganic layered compounds are, for the natural swellable clay minerals, water, alcohols (e.g. methanol, ethanol, propanol, isopropanol, ethylene glycol, diethylene glycol, etc.), dimethylformamide, dimethylsulfoxide, acetone and the like, in particular water and the alcohols, and for the organic-modified clay minerals, aromatic hydrocarbons (e.g. benzene, toluene, xylene, etc.), ethers (e.g. ethyl ether, tetrahydrofuran, etc.), ketones (e.g. acetone, methyl ethyl ketone, methyl isobutyl ketone, etc.), aliphatic hydrocarbons (e.g. n-pentane, n-hexane, n-octane, etc.), halogenated hydrocarbons (e.g. chlorobenzene, carbon tetrachloride, chloroform, dichloromethane, 1,2-dichloroethane, perchloroethylene, etc.), ethyl acetate, methyl methacrylate, dioctyl phthalate, dimethylformamide, dimethylsulfoxide, methylcellosolve, silicone oils, and the like.

The resins to be contained in the coating fluid are not limited. Examples of the resins are polyolefin resins, polyester resins, amide resins, acrylic resins, styrene resins, acrylonitrile resins, cellulose resins, halogen-containing resins, hydrogen-bondable resins, liquid crystalline resins, polyphenylene oxide resins, polymethylene oxide resins, polycarbonate resins, polysulfone resins, polyethersulfone resins, polyether ether ketone resins, and the like.

Preferable examples of the resins are highly hydrogen-bondable resins having a hydrogen-bondable or ionic group, which will be described below.

The total content of the hydrogen-bondable and/or ionic groups in the highly hydrogen-bondable resin is usually between 20 and 60 wt. %, preferably between 30 and 50 wt. %. The content of the hydrogen-bondable and/or ionic groups can be measured by NMR (e.g. $^1$H-NMR, $^{13}$C-NMR, etc.).

Examples of the hydrogen-bondable groups are hydroxyl, amino, thiol, carboxyl, sulfonic acid and phosphoric acid groups. Examples of the ionic groups are carboxylate, sulfonate ion, phosphate ion, ammonium and phosphonium groups. Among them, hydroxyl, amino, carboxyl, sulfonic acid, carboxylate, sulfonate ion and ammonium groups are preferable.

Specific examples of the highly hydrogen-bondable resins are polyvinyl alcohols, ethylene-vinyl alcohol copolymers having the vinyl alcohol content of at least 41 mole %, polysaccharide, polyacrylate and its esters, polysodium acrylate, polybenzenesulfonic acid, polysodium benzenesulfonate, polyethyleneimine, polyallylamine and its quaternary ammonium salt, polyvinylthiol, polyglycerol, polyvinylidene fluoride, polyacrylonitrile, and the like. Among them, polyvinyl alcohol and polysaccharide are preferred.

Polyvinyl alcohol includes polymers prepared by hydrolyzing or transesterifying the acetate moieties of vinyl acetate polymers, that is, copolymers of vinyl alcohol and vinyl acetate, and polymers prepared by saponifying polyvinyl trifluoroacetates, polyvinyl formate, polyvinyl pivalate, polytert.-butyl vinyl ethers, polytrimethyl silylvinyl ethers, and the like. The details of polyvinyl alcohols are found in "PVA WORLD" edited by the POVAL Society (published by KABUSHIKIKAISHA KOBUNSHI KANKO-KAI, 1992) and Nagano et al, "POVAL" (published by KABUSHIKIKAISHA KOBUNSHI KANKO-KAI, 1981).

The saponification degree of polyvinyl alcohols is preferably at least 70 mole %, more preferably at least 85 mole %. In particular, those having the saponification degree of at least 98 mol %, that is, so-called completely saponified products are preferred.

The polymerization degree of polyvinyl alcohols is preferably between 100 and 5000, more preferably between 200 and 3000.

The polysaccharides are biopolymers which are synthesized by polycondensation of various monosaccharides in organisms and include the chemically modified polysaccharides. Examples of the polysaccharides are cellulose, cellulose derivatives (e.g. hydroxycellulose, hydroxyethylcellulose, carboxymethylcellulose, etc.), amylose, amylopectin, pullulan, cardran, xanthan gum, chitin, chitosan, and the like.

The coating fluid used in the present invention is a fluid comprising the inorganic layered compound and the resin dispersed or dissolved in the dispersing medium. Preferably, the dispersing medium has the properties for swelling or cleaving the organic layered compound.

The ratio of the organic layered compound to the resin in the coating fluid is not limited. The weight ratio of the organic layered compound to the resin is usually between 1:20 and 10:1, preferably 1:20 and 2:1.

The total concentration of the organic layered compound and the resin is usually between 4 and 15 wt. %, preferably between 4 and 10 wt. %.

The coating fluid can be prepared by any conventional method, for example, (1) mixing a solution of the resin and a dispersion of the inorganic layered compound which has been swelled or cleaved;

(2) addition of a dispersion of the inorganic layered compound which has been swelled or cleaved to the resin;

(3) addition of the inorganic layered compound to a solution of the resin to swell or cleave the inorganic layered compound;

(4) thermally compounding the resin and the inorganic layered compound and then dispersing the mixture in a dispersing medium.

Among the above methods, the methods (1), (2) and (3) are preferable since the aspect ratio of the inorganic layered compound increases in the coating fluid.

The gravure coating method employed in the present invention means a coating method using a gravure roll (hereinafter referred to as "G roll") for coating.

The G roll may be a diagonal line roll, lattice roll or pyramid roll, and is selected according to the properties of the coating fluid.

A backing roll (hereinafter referred to as "B roll") is used for the purpose of stable coating.

The line speed of the coating process is usually controlled by the rotation speed of the B roll.

The laminated film can be produced by dipping the G roll in the container containing the above coating fluid, passing the base film which will be explained below between the G roll and B roll, applying the coating fluid onto the surface of base film, and drying the applied coating fluid to remove the dispersing medium. Thus, the laminated film comprising the base film and the layer containing the inorganic layered compound and the resin is obtained.

The amount of the coating fluid is not critical. The coating fluid is applied onto the base film in an amount sufficient for uniformly coating the surface of the base film.

Preferably, the applied coating fluid is dried as quickly as possible after the application to accelerate the formation of the layer containing the inorganic layered compound and the resin.

If portions of the laminated film are lapped by winding before the coating fluid layer is not well dried, they adhere to each other and therefore the layer containing the inorganic layered compound and the resin is unpreferably peeled off from the base film, when one portion of the laminated film is peeled off from the other.

The G roll is usually made of rubbers. Examples of the rubbers are NBR (acrylonitrile-butadiene copolymer), SBR (styrene-butadiene copolymer), EPDM (ethylene-propylene-diene copolymer), NR (cis-1,4-polyisoprene), CR (polychloroprene), IIR (isobutylene-isoprene copolymer), chlorosulfonated polyethylene, silicone rubbers (e.g. polydimethylsiloxane), fluororubbers (e.g. hexafluoropropylene-vinylidene fluoride copolymer), KP rubbers, urethane rubbers (e.g. polyester isocyanate or polyether isocyanate) and the like.

The conditions for gravure coating in the present invention satisfy the following equation (1):

$$7<\log[2((G/B)\times 100)^2\times(B+G)^2\times(GM)]<13 \qquad (1)$$

wherein G is the rotational speed of the G roll (m/min.), B is the rotational speed of the B roll (m/min.) and GM is the mesh number of the G roll, preferably satisfies the following equation (2):

$$10\leq\log[2((G/B)\times 100)^2\times(B+G)^2\times(GM)]\leq 12 \qquad (2)$$

wherein G, B and GM are the same as defined above.

When the rotational direction of the B roll is set positive, that of the G roll is also positive when the G roll rotates in the same direction as the B roll, while that of the G roll is negative when the G and B rolls rotate in the opposite directions.

The mesh number of the G roll is the number of markings per one inch of the roll.

The clearance R ($\mu$m) between the G and B rolls and the thickness W ($\mu$m) of the base film preferably satisfy the following equation (3):

$$1.1\ W<R<10{,}000\ W \qquad (3)$$

The clearance R is indicated by numeral 7 in FIG. 1, which schematically shows an example of a kiss reverse coating process. The kiss reverse coating means a coating process in which the clearance between the G and B rolls is larger than the thickness of the base film.

In FIG. 1, numeral 1 stands for a G roll, 2 stands for a B roll, 3 stands for a closed doctor, 4 stands for a moineau pump, 5 stands for a base film, 6 stands for a guide roll, and 7 stands for a clearance R.

Preferably, R is between 1.2 W and 5000 W.

R and W satisfies more preferably the following equation (4):

$$1.5\ W \leq R \leq 1000\ W \quad (4)$$

in particular the following equation (5):

$$2.0\ W \leq R \leq 50\ W \quad (5)$$

When the clearance R is too small, the number of scratches increases. When the clearance R is too large, the stability in the high speed coating tends to deteriorate. The smaller contact area between the base film and the G roll is better.

The water resistance of the laminated film, that is, the gas barrier properties in an atmosphere in which the laminated film is in contact with water, can be improved by thermally aging the laminated film at a temperature of between 110 and 220° C. after the formation of the layer containing the inorganic layered compound and the resin. The aging time is not limited as long as the film reaches the predetermined aging temperature. The aging time is preferably between 1 second and 100 minutes when means using a heating medium, for example, a hot air drier is used.

The heating source is not limited, and any conventional heating source such as a heat roll, a heating medium such as air and oils, infrared ray, microwave, and the like can be used.

The thickness of the layer containing the inorganic layered compound and the resin is not critical, and is usually 10 μm or less, preferably 1 μm or less in view of the transparency of the laminated film. The lower limit of the thickness of the layer is not limited, and is usually at least 1 nm, preferably at least 10 nm in view of the gas barrier properties of the laminated film.

The layer containing the organic compound and the resin, in particular, the highly hydrogen-bondable resin may contain a crosslinking agent for the resin to improve the water resistance.

Examples of the crosslinking agent for the hydrogen-bondable groups are titanium base coupling agents, silane coupling agents, melamine coupling agents, epoxy coupling agent, isocyanate coupling agent, copper compounds, zirconium compounds, and the like. Among them, the zirconium compounds are preferred.

Specific examples of the zirconium compounds are zirconium halides (e.g. zirconium oxychloride, zirconium hydroxychloride, zirconium tetrachloride, zirconium bromide, etc.), zirconium salts with inorganic acids (e.g. zirconium sulfate, basic zirconium sulfate, zirconium nitrate, etc.), zirconium salts with organic acids (e.g. zirconium formate, zirconium acetate, zirconium propionate, zirconium caprylate, zirconium stearate, etc.), zirconium complex salts (e.g. ammonium zirconium carbonate, sodium zirconium sulfate, ammonium zirconium acetate, sodium zirconium oxalate, sodium zirconium citrate, ammonium zirconium citrate, etc.), and the like.

The amount of the cross linking agent for the highly hydrogen-bondable resin is so selected that a ratio K of the total number of the crosslinking sites of the crosslinking agent (CN) to the total number of the hydrogen-bondable or ionic groups of the highly hydrogen-bondable resin (HN) is between 0.001 to 10, preferably between 0.01 and 1.

The crosslinking agent can be added to the layer containing the inorganic layered compound and the resin by any conventional method. For example, the specific amount of the crosslinking agent is added to the coating fluid containing the inorganic layered compound and the resin, or a solution of the crosslinking agent is impregnated in the already formed layer of the inorganic layered compound and the resin.

The kind of the base film is not limited as long as it is transparent. In general, a resin film is used. Examples of the resin for the base film are polyolefin resins such as low or high density polyethylene, ethylene-propylene copolymers, ethylene-butene copolymers, ethylene-hexene copolymers, ethylene-octene copolymers, polypropylene, ethylene-vinyl acetate copolymers, ethylene-methyl methacrylate copolymers, ionomer resins, etc.; polyester resins such as polyethylene terephthalate, polybutylene terephthalate, polyethylene naphthalate, etc.; amide resins such as Nylon-6, Nylon-6,6, m-xylenediamine-adipic acid polycondensates, polymethyl methacrylimide, etc.; acrylic resins such as polymethyl methacrylate; styrene or acrylonitrile base resins such as polystyrene, styrene-acrylonitrile copolymers, styrene-acrylonitrile-butadiene copolymers, polyacrylonitrile, etc.; hydrophobicized cellulose resins such as cellulose triacetate, cellulose diacetate, etc.; halogen-containing resins such as polyvinyl chloride, polyvinylidene chloride, polyvinylidene fluoride, polytetrafluoroethylene, etc.; hydrogen-bondable resins such as polyvinyl alcohol, ethylene-vinyl alcohol copolymers, cellulose derivatives, etc.; and engineering plastics such as polycarbonate resins, polysulfone resins, polyethersulfone resins, polyether ether ketone resins, polyphenylene oxide resins, polymethylene oxide resins, liquid crystalline resins, etc.

Among the films of the above resins, biaxially orientated films of polypropylene, polyethylene terephthalate and Nylon, and polyvinylidene chloride-coated (K coat) biaxially orientated films of polypropylene, polyethylene terephthalate and Nylon.

The thickness of the base film is usually between 5 μm and 5 mm, preferably between 12 and 40 μm.

The base film may contain various additives such as IR ray absorbers, colorants, antioxidants and the like, as long as the effects of the present invention do not deteriorate.

A sealant layer may be coated over the layer containing the inorganic layered compound and the resin when the laminated film of the present invention is used for the packaging applications.

The resin used as the sealant layer is not limited. Preferable examples of the resin for the sealing layer are polyolefins such as polypropylene, low or high density polyethylene, ethylene-propylene copolymers, ethylene-butene copolymers, ethylene-hexene copolymers, ethylene-4-methyl-1-pentene copolymers, ethylene-octene copolymers, ethylene-vinyl acetate copolymers, ethylene-methyl methacrylate copolymers, ethylene-methyl acrylate copolymers, ethylene-acrylic acid copolymers, ionomer resins, etc.; and polyester resins such as polyethylene terephthalate, polybutylene terephthalate, etc.

The sealant layer may be formed by any conventional method. For example, the resin for the sealant layer is dissolved in a suitable solvent and applied on the layer containing the inorganic layered compound and the resin, or the sealing layer is extruded and laminated on the layer containing the inorganic layered compound and the resin. The interface between the sealant layer and the layer containing the inorganic layered compound and the resin may be treated by corona discharge or with an anchor-coating agent.

The laminated film of the present invention preferably has an oxygen permeability of 2 $cc/m^2$.day.atm. or less, more preferably 0.2 $cc/m^2$.day.atm. or less, per 1 μm of the film thickness when measured at 31° C. and 61% RH.

The laminated film of the present invention has excellent transparency and significantly decreased total haze, and can be used for various applications.

The laminated film has the excellent gas barrier properties after the water-resistance test when the inorganic layered compound is the clay mineral having the swelling or cleaving properties. The gas barrier properties after the water-resistance test are further improved when the resin is the highly hydrogen-bondable resin.

Furthermore, the laminated film of the present invention has greatly decreased scratches on the base film.

EXAMPLES

The present invention will be illustrated by the following examples, which do not limit the scope of the present invention in any way.

The methods for measuring properties used in the examples are as follows:

Haze

The haze of the film was measured using a haze meter manufactured by SUGA SHIKENKI according to JIS K 7105.

Thickness

The film thickness of 0.5 $\mu$m or larger was measured using a digital thickness meter (a contact type thickness meter. trade name: Ultra High Accurate Decimicrohead MH-15M manufactured by NIPPON KOGAKU).

The thickness less than 0.5 $\mu$m was measured by a weight analysis method, or an elemental analysis method for the laminated film.

In the weight analysis method, the thickness was calculated by dividing the measured weight of the film having the specific area by the film area and further by the gravity of the composition.

In the elemental analysis, the ratio of thickness of the coated layer of the resin composition to that of the base film is calculated from the ratio of the analyzed amount of the specific inorganic element in the laminated film (originated from the composition of the laminated layer) to the content of the specific element in the inorganic layered compound alone.

Particle Size

The particle size was measured in water at 25° C. with a ultrafine particle size analyzer (BI-90 manufactured by Blookheaven). The center size obtained by the photon correlation method according to the dynamic light scattering method was used as the particle size L.

Aspect Ratio

The X-ray diffraction patterns were obtained by the powder method using an X-ray diffraction meter (XD-5A manufactured by Shimadzu Corporation) with the inorganic layered compound alone and the resin composition containing the inorganic layered compound. The interplanar spacing (unit thickness) "a" of the inorganic layered compound was calculated from the X-ray diffraction pattern. It was confirmed from the X-ray diffraction pattern for the resin composition that the interplanar spacing of the inorganic layered compound was widened in some parts.

The aspect ratio Z (=L/a) was calculated from the particle size L obtained by the dynamic light scattering and the above interplanar spacing "a".

Evaluation of Scratches

The base film was observed with the sun light behind and the scratches were identified with an eye. "O" indicates that no scratch was formed, while "X" indicates that the scratches were formed.

Preparation of Coating Fluid A

The coating fluid A was prepared as follows:

An equal weight mixture of two polyvinyl alcohols (PVA 117 H available from KURARAY having the saponification degree of 99.6% and the polymerization degree of 1700 and PVA 103 available from KURARAY having the saponification degree of 98.5% and the polymerization degree of 300) was dissolved in ion exchanged water (less than 0.7 $\mu$S/cm) at a concentration of 4.0 wt. %. This solution will be referred to as the resin solution B.

Natural montmorilonite (KUNIPIA F available from KUNIMINE Industries, Ltd. having the particle size L of 0.56 $\mu$m and the aspect ratio of 461) in the powder form was added to and dispersed in the resin solution B in such an amount that the total weight of the polyvinyl alcohols and montmorilonite was 6.0 wt. %, and a mixed composition liquid was obtained.

Ammonium zirconium carbonate (ZIRCOSOL AC 7 available from DAI-ICHI Rare Elements Industries, Ltd.) in the form of an aqueous solution containing 15 wt. % of the compound in terms of zirconium oxide) as a crosslinking agent was added to the mixed composition in such an amount that the molar ratio of the hydroxyl group of polyvinyl alcohols to the zirconium element was 15:1, and the coating fluid A was obtained.

Preparation of Coating Fluid B

The coating fluid B was prepared as follows:

A quantity of polyvinyl alcohol (PVA 117H available from KURARAY having the saponification degree of 99.6% and the polymerization degree of 1700) was dissolved in ion exchanged water (less than 0.7 $\mu$S/cm). Then, natural montmorilonite (KUNIPIA F available from KUNIMINE Industries, Ltd. having the particle size L of 0.56 $\mu$m and the aspect ratio of 461) in the powder form was added to and dispersed in the above solution in such an amount that the total weight of the polyvinyl alcohol and montmorilonite was 5.0 wt. %. The weight ratio of montmorilonite to the polyvinyl alcohol was 1:2.

EXAMPLES 1–20

A biaxially orientated polyethylene terephthalate (OPET) film having the thickness of 12 $\mu$m (LUMILAR Q27 available from TORAY) a surface of which had been corona treated was used as a base film.

A mixture of a polyester resin (AD 335A available from TOYO MORTON Co., Ltd.) (32 wt. %) as a main component and an isocyanate compound (CAT 10 available from TOYO MORTON Co., Ltd.) (76 wt. %) as a hardener was added to a mixed solvent of toluene and methyl ethyl ketone (weight ratio of 1:1), and a solution having the final solid content of 2 wt. % was obtained. This solution was used as an anchor coating agent (two liquid type).

The anchor coating agent was gravure coated on the above base film and dried to form a layer of the anchor coating agent.

Then the coating fluid A was gravure coated on the layer of the anchor coating agent under the conditions shown in Table 1 with a test coater (TEST No. 3 manufactured by INOUE Metal Industries, Ltd. clearance between the G and B rolls: 14 μm. drying temperature: 100° C.). The line speed was the same as the rotational speed of the backing roll.

The results of evaluation of the obtained laminated films are shown in Table 1.

COMPARATIVE EXAMPLE 1

A laminated film was produced in the same manner as in Examples 1–20 except that the coating fluid A was microgravure coated using a test coater (manufactured by YASUI SEIKI; microgravure coating at a coating speed of 1.5 m/min. gravure mesh number of 80. clearance between the G and B rolls: 14 μm. drying temperature: 100° C.) with setting a ratio of the rotational speed of the G roll to that of the B roll (G/B) at 0.7.

The results of evaluation of the obtained laminated film are shown in Table 1.

COMPARATIVE EXAMPLE 2

A laminated film was produced by hand coating the coating fluid A with a bar on the same base film as used in Examples 1–20 and drying it at 100° C.

COMPARATIVE EXAMPLE 3

A laminated film was produced by hand coating the coating fluid A with a bar on a biaxially orientated polypropylene (OPP) film having the thickness of 20 μm (PYLENE P1202 available from TOYOBO) a surface of which had been corona treated as a base film, and drying it at 100° C.

The results of evaluation of the obtained laminated films of Comparative Examples 1 and 2 are shown in Table 1.

TABLE 1

| Example No. | Gravure mesh number | Line speed[1] (m/min) | G/B × 100 | G + B (m/min.) | Coating layer thickness (nm) | Haze (%) Total | Haze (%) External |
|---|---|---|---|---|---|---|---|
| 1 | 80 | 50 | 100 | 100 | 710 | 13.5 | 12.5 |
| 2 | 80 | 80 | 100 | 160 | 660 | 13.0 | 12.0 |
| 3 | 80 | 100 | 100 | 200 | 449 | 10.0 | 9.0 |
| 4 | 80 | 150 | 100 | 300 | 390 | 9.4 | 8.4 |
| 5 | 80 | 200 | 100 | 400 | 353 | 6.9 | 5.9 |
| 6 | 80 | 200 | 150 | 500 | 314 | 5.8 | 4.8 |
| 7 | 80 | 200 | 200 | 600 | 296 | 4.5 | 3.5 |
| 8 | 80 | 200 | 250 | 700 | 294 | 4.4 | 3.4 |
| C. 1 | 80 | 1.5 | 70 | 2.55 | 976 | 23.0 | 22.0 |
| C. 2 | — | — | — | — | 550 | 24.2 | 23.2 |
| C. 3 | — | — | — | — | 600 | 25.0 | 23.5 |
| 9 | 200 | 20 | 100 | 40 | 224 | 8.3 | 7.3 |
| 10 | 200 | 20 | 150 | 50 | 144 | 6.6 | 5.6 |
| 11 | 200 | 20 | 200 | 60 | 98 | 5.3 | 4.3 |
| 12 | 200 | 20 | 250 | 70 | 48 | 4.4 | 3.4 |
| 13 | 200 | 100 | 100 | 200 | 160 | 4.5 | 3.5 |
| 14 | 200 | 100 | 120 | 220 | 96 | 3.8 | 2.8 |
| 15 | 200 | 100 | 250 | 350 | 38 | 2.7 | 1.7 |
| 16 | 80 | 125 | 100 | 250 | 401 | 9.2 | 8.2 |
| 17 | 80 | 175 | 100 | 350 | 337 | 7.5 | 6.5 |
| 18 | 80 | 300 | 100 | 600 | 350 | 7.2 | 6.2 |
| 19 | 80 | 400 | 100 | 800 | 320 | 7.1 | 6.1 |
| 20 | 80 | 500 | 100 | 1000 | 295 | 5.8 | 4.8 |

Note: 1) Line speed = Rotational speed of backing roll.

It is seen from the results in Table 1 that the haze decreases as the ratio of rotational speed of the rolls (G/B) increased or as the sum of the rotational speed of the rolls (G+B) increases.

EXAMPLES 21–25

The anchor coating agent was coated in the same manner as in Examples 1–20 on the same biaxially orientated polypropylene (OPP) film as used in Comparative Example 3 a surface of which had been corona treated. Then, the coating fluid B was kiss reversed coated on the layer of the anchor coating agent under the conditions shown in Table 2 and dried at 120° C.

The clearance between the G and B rolls was 300 μm. The line connecting the axes of the G and B rolls was perpendicular to the base film.

The results of evaluation of the obtained laminated films are shown in Table 2.

TABLE 2

| Example No. | Gravure mesh number | Line speed[1] (m/min.) | G/B × 100 | G + B (m/min.) | Coating layer thickness (nm) | Haze (%) total | Haze (%) External | Evaluation of scratch |
|---|---|---|---|---|---|---|---|---|
| 21 | 80 | 50 | 100 | 100 | 300 | 10.1 | 9.0 | O |
| 22 | 80 | 100 | 100 | 200 | 270 | 8.9 | 7.8 | O |
| 23 | 80 | 150 | 100 | 300 | 160 | 7.4 | 6.4 | O |
| 24 | 80 | 200 | 100 | 400 | 160 | 5.3 | 4.3 | O |
| 25 | 80 | 240 | 100 | 480 | 150 | 4.3 | 3.3 | O |

Note: 1) Line speed = Rotational speed of backing roll.

What is claimed:

1. A laminated film comprising:

a base film; and a layer which contains (a) an inorganic layered compound, and (b) a resin, said layer being formed by gravure coating a coating fluid comprising the inorganic layered compound and the resin under the conditions satisfying the following equation (1):

$$7<\log(2((G/B)\times100)^2\times(B+G)^2\times(GM))<13 \quad (1)$$

wherein G is a rotational speed of a gravure roll (m/min.), B is a rotational speed of a backing roll (m/min.) and GM is a mesh number of a gravure roll, wherein the inorganic layered compound is an inorganic compound having a layered structure in which unit crystalline layers are laminated.

2. The laminated film according to claim 1, wherein the conditions in the gravure coating satisfy the following equation (2):

$$10\leqq\log[2((G/B)\times100)^2\times(B+G)^2\times(GM)]\leqq12 \quad (2)$$

wherein G, B and GM are the same as defined above.

3. The laminated film according to claim 1, wherein the conditions in the gravure coating further satisfy the following equation (3):

$$1.1\ W<R<10{,}000\ W \quad (3)$$

wherein R is a clearance ($\mu$m) between the gravure and backing rolls and W is a thickness ($\mu$m) of the base film.

4. The laminated film according to claim 3, wherein the conditions in the gravure coating further satisfy the following equation (4):

$$1.5\ W\leqq R\leqq1000\ W \quad (4)$$

wherein R and W are the same as defined above.

5. The laminated film according to claim 3, wherein the conditions in the gravure coating further satisfy the following equation (5):

$$2\ W\leqq R\leqq50\ W \quad (5)$$

wherein R and W are the same as defined above.

6. The laminated film according to claim 1, wherein said inorganic layered compound has a particle size of 5 $\mu$m or less and an aspect ratio of between 50 and 5000.

7. The laminated film according to claim 6, wherein said inorganic layered compound has swelling or cleaving properties in a dispersing medium.

8. The laminated film according to claim 7, wherein said inorganic layered compound is a clay mineral.

9. The laminated film according to claim 6, wherein said inorganic layered compound has an aspect ratio of between 200 and 3000.

10. The laminated film according to claim 1, wherein a weight ratio of said inorganic layered compound to said resin is between 1:20 and 10:1.

11. The laminated film according to claim 1, wherein said resin is a resin having 30 to 50 wt. % of hydrogen-bondable or ionic groups.

12. The laminated film according to claim 1, wherein said resin is at least one resin selected from the group consisting of polyvinyl alcohol resins and polysaccharides.

13. The laminated film according to claim 1, wherein said base film is selected from the group consisting of biaxially orientated polypropylene films, biaxially orientated polyamide films and biaxially orientated polyethylene terephthalate films.

14. The laminated film according to claim 1, which has an oxygen permeability of 2 cc/m$^2$.day.atm. or less per 1 $\mu$m of the film thickness when measured at 31° C. and 61% RH.

15. The laminated film according to claim 14, which has an oxygen permeability of 0.2 cc/m$^2$.day.atm. or less per 1 $\mu$m of the film thickness when measured at 31° C. and 61% RH.

16. The laminated film according to claim 1, wherein said resin is a resin having 30 to 50 wt. % of at least one group selected from the group consisting of hydroxyl, amino, thiol, carboxyl, sulfonic acid, phosphoric acid, carboxylate, sulfonate ion, phosphate ion, ammonium and phosphonium groups.

* * * * *